United States Patent
Dorer

[15] 3,687,905
[45] Aug. 29, 1972

[54] REACTION PRODUCT OF CARBOXYLIC ACID WITH DEGRADED ETHYLENE-PROPYLENE INTERPOLYMER

[72] Inventor: Casper J. Dorer, Lyndhurst, Ohio

[73] Assignee: The Lubrizol Corporation, Wickliffe, Ohio

[22] Filed: March 16, 1970

[21] Appl. No.: 24,447

Related U.S. Application Data

[60] Division of Ser. No. 737,860, June 18, 1968, which is a continuation-in-part of Ser. No. 569,085, Aug. 1, 1966, abandoned, which is a division of Ser. No. 416,618, Dec. 7, 1964, Pat. No. 3,316,177.

[52] U.S. Cl............................260/78.4 D, 252/51.5 A, 260/80.78;78.5 T;88.2 S;94.9GC
[51] Int. Cl................................................C08f 17/08
[58] Field of Search........260/94.9 G, 88.2 S, 78.4 D, 260/78.5 T

[56] References Cited

UNITED STATES PATENTS

| | | | |
|---|---|---|---|
| 2,973,344 | 2/1961 | Fasce | 260/78.4 D |
| 3,322,711 | 5/1967 | Bush | 260/29.6 |
| 3,235,503 | 2/1966 | de Vries | 252/51.5 |

FOREIGN PATENTS OR APPLICATIONS

| | | | |
|---|---|---|---|
| 476,476 | 8/1951 | Canada | 260/94.9 G |

*Primary Examiner*—Joseph L. Schofer
*Assistant Examiner*—John Kight, III
*Attorney*—Roger Y. K. Hsu and William H. Pittman

[57] ABSTRACT

An oxidized, degraded interpolymer of ethylene and propylene is reacted with an unsaturated acid or derivative thereof, preferably maleic acid or anhydride, to form an acidic intermediate. This acidic intermediate is reacted with a polyamine to form a product which is useful as an additive in fuels, lubricant compositions and hydrocarbon oils.

11 Claims, No Drawings

REACTION PRODUCT OF CARBOXYLIC ACID WITH DEGRADED ETHYLENE-PROPYLENE INTERPOLYMER

This application is a division of copending application Ser. No. 737,860, filed June 18, 1968, which is a continuation-in-part of application Ser. No. 569,085, filed Aug. 1, 1966 both of said applications are now abandoned. The latter application in turn is a division of application Ser. No. 416,618, filed Dec. 7, 1964, now U.S. Pat. No. 3,316,177.

This invention relates to new compositions of matter suitable for use as additives for lubricants, fuels and the like, or as intermediates for the preparation of such additives. More particularly, it relates to carboxylic acids or derivatives thereof characterized by the presence therein of an organic radical derived from an oxidized, degraded interpolymer of ethylene and propylene having a molecular weight of at least about 1,000, and to nitrogen-containing compositions prepared by reacting said acids or derivatives thereof with a polyamine having at least one primary or secondary amino group.

Most of the gasoline produced today is obtained by thermal or catalytic cracking of heavier petroleum hydrocarbon feed stocks such as light or heavy gas oils, cycle stocks, virgin or topped crude oils, lube stocks, kerosene, and kerosene-gas oil mixtures. A number of different thermal and/or catalytic cracking processes known in the petroleum industry under designations such as Fluid Process, Thermofor, Houdry, Platforming, Thermal Reforming, Viscosity-Breaking, etc., are employed for the purpose. Although these various processes differ considerably as to the precise manner in which the heavier hydrocarbon molecules are cracked to yield gasoline, they all involve the heating of the hydrocarbon feed stock to a high temperature (370°–,200° F.) and the passage of such heated stock, optionally mixed with a cracking catalyst, through heated tubes, reactors, converters and tower stills.

Regardless of the particular process used, the cracking operation always results in the formation of some undesirable carbonaceous material or "refinery coke" which adheres to the tubes, preheaters, reactors, etc., of the cracking unit and lowers its efficiency, principally by impeding the flow of the feed stock therethrough and the transfer of heat to or from such stock. After enough carbonaceous material has accumulated on the various parts of the cracking unit to lower its efficiency substantially, the unit must be dismantled, cleaned, and reassembled. Of courses, such cleaning operations are not only tedious and costly, but result in a large proportion of "downtime" during which the unit is not functioning. Although the use of modern Platforming and catalytic cracking processes has reduced the amount of down-time as compared with older, strictly thermal cracking processes, the accumulation of refinery coke still presents a problem to the petroleum refining industry.

A principal object of this invention, therefore, is to provide additives in fuels, lubricants, petroleum fractions and other hydrocarbon compositions.

Another object is to inhibit the formation of harmful deposits in refinery cracking units.

Another object is to inhibit the accumulation of harmful deposits in hydrocarbon compositions which are subjected to high temperature and pressure.

Still another object is to inhibit the formation of harmful deposits in heat exchange units.

Other objects will in part be obvious and will in part appear hereinafter.

The oxidized, degraded interpolymers (hereinafter sometimes referred to merely as "the degraded interpolymers") useful for preparing the compositions of this invention are derived principally from ethylene and propylene. They may include minor amounts, i.e., up to about 10 percent based on the molar amounts of monomeric ethylene and propylene units in the interpolymer, of polymerized units derived from other monomers. Examples of such other monomers include polymerizable mono-olefins having at least four carbon atoms such as 1-butene, 1-pentene, 2-butene, 3-hexene, 4-methyl-1-pentene, 1-decene, 1-nonene, 2-methylpropene, and 1-dodecene. They also include polymerizable polyenes; e.g., conjugated polyenes, for example, butadiene, isoprene, piperylene, 1,3-hexadiene, 1,3-octadiene, 2,4-decadiene, etc., and non-conjugated polyenes such as 3,3-dimethyl-1,5-hexadiene, 1,9-decadiene, dicyclopentadiene, 1,19-elcosadiene, 1,4-pentadiene, 1,5-hexadiene, etc. These non-conjugated dienes are especially useful in the interpolymer. For the most part, such other monomers contain about four to 10 carbon atoms although they may contain as many as 25 carbon atoms.

Interpolymers containing about 20–70 mole percent of polymerized propylene, about 30–80 mole percent of polymerized ethylene, and up to about 10 mole percent of another polymerized olefin are especially useful and those containing about 25–50 mole percent of polymerized propylene, about 50–75 mole percent of polymerized ethylene and about 1–10 mole percent of a polymerized non-conjugated diene are preferred.

The interpolymers from which the degraded polymers of the above process are derived usually have molecular weights of at least about 50,000. They may have molecular weights of as high as 800,000 or higher. The interpolymers having molecular weights of about 80,000 are especially useful.

The degraded interpolymers are prepared most conveniently by heating an interpolymer such as illustrated above at a temperature of at least about 100° C. in the presence of oxygen or air so as to cause the degradation of the interpolymer. Such degradation is characterized by a substantial reduction of the molecular weight of the interpolymer. The mechanism by which the interpolymer is degraded is not precisely known; nor is the chemical composition of the degraded product. It is known, however, from infra-red analysis that the product contains oxygen in the form of carboxylic acid, ester and carbonyl groups. A degraded interpolymer having a molecular weight of at least about 1,000, and which has been degraded to the extent that its molecular weight is at least about 5 percent less than the molecular weight of the interpolymer before degradation, is useful for the purposes of this invention. An interpolymer having a molecular weight of about 3,000–5,000 or as high as about 200,000 is preferred.

The oxidized and degraded interpolymer may be prepared by heating a fluid solution of a suitable interpolymer in an inert solvent in the presence of oxygen or air at a temperature of at least about 100° C. until the desired degradation is achieved. In lieu of oxygen or air, a mixture of oxygen and an inert gas such as nitrogen or carbon dioxide may be used. The inert gas thus functions as a carrier of oxygen and often provides a convenient means of introducing oxygen into the reaction mixture.

The oxygen or air may be introduced by bubbling it through the polymer solution. However, it is frequently preferred to merely blow air over the surface of the solution while subjecting the solution to vigorous shearing agitation.

The inert solvent useful in preparing the fluid solution of the interpolymer is preferably a liquid inert hydrocarbon such as naphtha, hexane, cyclohexane, dodecane, mineral oil, biphenyl, xylene or toluene. It may be an ether or similar solvent such as diphenyl oxide. The amount of the solvent to be used is not critical so long as a sufficient amount is used to result in the fluid solution of the interpolymer. Such solution usually contains about 60–95 percent of the solvent.

The temperature at which the interpolymer is degraded is at least about 100° C., preferably at least about 150° C., and it may be as high as 250° C., 300° C., or even higher.

The acidic compositions of this invention are prepared by simply reacting the degraded interpolymer with an unsaturated carboxylic acid or derivative thereof. By "derivative thereof" is meant anhydrides, acid halides, esters, amides and the like. Suitable unsaturated acids and derivatives include maleic acid, maleic anhydride, itaconic acid, dimethyl itaconate, acrylic acid, ethyl acrylate, methyl methacrylate, methacrylamide oleic acid, linoleic acid, etc. The preferred acidic compounds are those containing alpha, beta-unsaturation. Maleic anhydride is especially preferred.

In general, the degraded interpolymer is reacted with about 1–20 percent (by weight), preferably about 2–10 percent, of the acidic compound at about 80° C. or higher, preferably about 100°–250° C.

The reaction may be carried out in the presence of a solvent such as xylene, benzene, naphtha, chlorobenzene, nitrobenzene or diphenyl ether. Mineral oil is especially useful as a solvent. The use of a solvent is particularly advantageous in cases where one of the reactants is a viscous liquid or a solid; the solvent in such cases functions to facilitate the mixing of the reactants and the control of the reaction temperature.

While the molecular structure of the acidic compositions of this invention is not known with absolute certainty, there is good evidence that the reaction between the degraded interpolymer and the unsaturated acid is one of alkylation and results in the formation of a carbon-to-carbon bond. In this respect, it is similar to the known alkylation of maleic anhydride with polyisobutene and the like. It appears that the oxygen-containing radicals of the degraded interpolymer take no direct part in the reaction. The acidic composition resulting from the reaction of the degraded interpolymer with maleic anhydride is thus believed to be a substituted maleic or succinic anhydride. A single molecule thereof may contain one or more anhydride radicals.

The acidic composition described above, in addition to reacting with polyamines as illustrated hereinafter, is useful as an intermediate for preparing other compositions, e.g., metal salts including those of zinc and barium, which are likewise useful as improvement agents for lubricating compositions.

The polyamines useful for preparing the nitrogen-containing compositions of this invention are, in general, those containing at least one primary or secondary amino group. Especially preferred are alkylene polyamines and heterocyclic polyamines containing alkylene groups. These include ethylene diamine, diethylene triamine, triethylene tetramine, tetraethylene pentamine, trimethylene diamine, N,N-dimethyl(trimethylenediamine), bis(dimethylaminopropyl)amine, propylene diamine, tetramethylene diamine, butylene diamine, N-aminoethyl trimethylene diamine, N-dodecyl propylene diamine, di-(trimethylene)triamine, pentaethylene hexamine, etc. Also included are higher and cyclic homologs of such amines such as piperazines, aminopropylmorpholine, etc.

The ethylene polyamines are especially useful. They are discussed in some detail under the heading "Ethylene Amines" in "Encyclopedia of Chemical Technology," Kirk and Othmer, Volume 5, pages 898–905, Interscience Publishers, New York (1950). Such compounds are prepared most conveniently by the reaction of an alkylene dihalide, e.g., ethylene dichloride, with ammonia or a primary amine. This reaction results in the production of somewhat complex mixtures of alkylene polyamines including heterocyclic condensation products such as piperazine, N-aminoethylpiperazine, etc. Satisfactory products may be obtained also by the use of pure alkylene amines. An especially useful alkylene polyamine for reasons of economy as well as effectiveness of the products derived therefrom is a mixture of ethylene polyamines prepared by the reaction of ethylene chloride and ammonia and having about 2–7 amino groups per molecule.

The process by which the nitrogen-containing composition of this invention is prepared usually involves reacting the acidic composition with the alkylene polyamine at a temperature of at least about 25° C., preferably about 80°–250° C. A higher temperature may be used in the process provided that it does not exceed the decomposition point of the reaction mixture.

The amount of the alkylene polyamine to be used in the process depends to a large extent on the acidity of the acidic composition, that is, the amount of the alkylene polyamine reactant to be used in the process is chemically equivalent to the acidic composition. However, about 0.8–2.0 or more equivalents of the alkylene polyamine per equivalent of the acidic intermediate may be used. The equivalent weight of an amine depends on the number of amino groups in a molecule. For instance, diethylene triamine has 3 equivalents per mole.

The chemical composition of the product, i.e., the nitrogen-containing composition, of the above process is not fully understood. It depends to some extent upon the temperature at which the product is formed. For instance, where the reaction of the acidic composition and the amine is carried out at a temperature below about 100° C., the product will contain a substantial quantity of the amine salt whereas if such reaction is carried out at a temperature above about 150° C., the product will contain a substantial quantity of an imide, amide or amidine. In most instances, the product will be a complex mixture, the precise composition of which is not known. It is known, however, that the product, regardless of the relative proportions of its components, is useful for the purposes of this invention.

The following examples illustrate the preparation of the compositions of this invention.

EXAMPLE 1

Tetrachloroethylene (3 l.) is passed through a silica gel column, sparged with nitrogen and then added under nitrogen to a dry reaction flask at 25° C. Agitation is begun and an equimolar mixture of gaseous ethylene and propylene is introduced below the tetrachloroethylene liquid surface at a rate of 100 ml. per second until a saturated monomer solution is obtained, the excess gas being allowed to escape through a gas outlet tube. To this saturated solution there is added 8 ml. (0.0128 mole) of a 1.6 molar solution of aluminum triisobutyl in cyclohexane and 0.94 ml. (0.010 mole) of vanadyl trichloride, separately and rapidly in turn, by means of syringes, through an opening in the reactor sealed with a soft rubber cap. The tetrachloroethylene solution turns to a clear amber color and the temperature rises to about 40° C. after a minute. To the agitated reaction mixture at 35°–40° C., an equimolar mixture of gaseous ethylene and propylene is introduced at a rate of 100 ml. per second over a period of 0.5 hour. To the reaction mixture there is added 5 ml. of n-butanol and the polymer separates as a rubbery swollen solid which is squeezed free of excess solvent, washed several times with fresh n-butanol, and dried. The copolymer thereby obtained has a propylene content of 20 mole percent and a molecular weight of 250,000. This copolymer is then dissolved in 4 times its weight of diphenyl oxide and blown with oxygen at a temperature of 150°–180° C. for 6 hours. The oxidized, degraded polymer has a molecular weight of 5,000.

A portion of the degraded polymer in diphenyl oxide is mixed with 1 percent (by weight of the polymer) of maleic anhydride and the mixture is heated at 200° C. for 3 hours to form an acidic product. The acidic product is then reacted with a stoichiometric amount of ethylene diamine at 120°–150° C. The reaction mixture is dissolved in SAE 20 mineral oil and is heated at 120°–150° C./1 mm. to distill off volatile components. The residue is an oil solution of the nitrogen containing product.

EXAMPLE 2

A solution of 30 grams (0.15 mole) of aluminum triisobutyl and 84 grams (0.6 mole) of decene-1 in 200 ml. of tetrachloroethylene is heated at reflux under a nitrogen atmosphere for 2 hours to form aluminum tridecyl. The solution was cooled to room temperature and blended with 1,800 ml. of tetrachloroethylene, presaturated with an ethylene-propylene gas mixture containing 75 mole percent of propylene. The ethylene-propylene mixture is fed into the tetrachloroethylene solution at a rate of 37.5 ml. per second. Introduction of ethylene and propylene is continued as a solution of 4.35 grams (0.025 mole) of vanadyl trichloride in 100 ml. of tetrachloroethylene is added to the reaction mixture with vigorous stirring at 29°–41° C. over a period of 2 minutes. The catalyst forms a clear violet solution and rapid absorption of the gas feed commences. Thereafter, 30 ml. (0.108 mole) of a 3.6 molar solution of 1,4-hexadiene in tetrachloroethylene is added over a period of 9 minutes to the reaction mixture at 41°–48° C. The feed of ethylene and propylene is continued and 53.4 ml. (0.192 mole) more of the 3.6 molar 1,4-hexadiene solution is added to the reaction mixture over a period of 2 hours at 38°–40° C. Then 6 liters of n-butanol are added to the reaction mixture causing precipitation of the interpolymer. The precipitate is slurried with acetone in a Waring blender and then dried on a rubber mill at 50° C. The product (97 grams) is a soft, rubbery terpolymer which has a propylene content of 42 mole percent, a diene content of 1.2 mole percent corresponding to an iodine number of 8.9, and, by difference, an ethylene content of 56.8 mole percent. The terpolymer has an RSV of about 2.1, corresponding to a molecular weight of 125,500 (RSV is an abbreviation of "reduced specific viscosity" which means the specific viscosity, corrected to 0 shear gradient, divided by the concentration of the polymer solution in grams per 100 ml. In actual measurement, the viscosity is that of a decalin solution, at 135° C., of the polymer at a concentration of 0.1 gram in 100 ml. of the solution. The molecular weight of the polymer is calculated according to the equation $RSV - AM^x$ where M is the molecular weight, A and $x$ are specific constants characteristic of the polymer; Kirk and Othmer, Encyclopedia of Chemical Technology, (2nd Supp. 1960 at 663) and Gaylord and Mark, Linear and Stearyl Regular Addition Polymers, page 79 (1959).

A solution of 500 grams of this interpolymer in 2,000 grams of diphenyl oxide is blown with oxygen at 200°–225° C. for 4 hours. The degraded polymer solution (1830 grams) is mixed with maleic anhydride (41 grams) at 230° C. for 4 hours and then heated at 200° C./1 mm. to remove volatile components. The residue, 383 grams, is mixed with 383 grams of xylene and the xylene solution has an acid number of 22. A portion of this solution (100 grams) in 100 grams of mineral oil is reacted with twice the stoichiometric amount of N,N-dimethyl trimethylenediamine at 90°–170° C. whereupon water formed during the reaction is distilled off. The residue is heated to 170° C./4–5 mm. and filtered. The filtrate is a 65.3 percent oil solution of the nitrogen-containing product having a nitrogen content of 0.5 percent.

EXAMPLE 3

A product is obtained by a procedure essentially the same as that of Example 2 from these reactants: the oxidized, degraded interpolymer of Example 2, maleic anhydride (10 percent by weight of the polymer), a mixture of N,N-dimethyl trimethylene-diamine and a commercial polyethylene polyamine mixture having an average of 2–7 amino groups per molecule in a weight ratio of 9:1 (twice the stoichiometric amount of the polymer-maleic anhydride reaction product). The product is dissolved in mineral oil and a 65 percent oil solution of the product has a nitrogen content of 0.55 percent.

EXAMPLE 4

A product is prepared by a procedure essentially the same as that of Example 2 from these reactants: the degraded interpolymer of Example 2, maleic anhydride (5 percent by weight of the polymer), and N,N-dimethyl trimethylenediamine (twice the equivalent amount of the polymer-maleic anhydride reaction product). The product is dissolved in mineral oil and a 66 percent oil solution of the product has a nitrogen content of 0.37 percent.

EXAMPLE 5

A product is prepared by a procedure essentially the same as that of Example 2 from these reactants: the degraded polymer of Example 2, maleic anhydride (2 percent by weight of the polymer), and bis-(dimethylaminopropyl)amine (twice the stoichiometric amount of the polymer-maleic anhydride reaction product). The product is dissolved in mineral oil and a 62 percent oil solution of the product has a nitrogen content of 1.27 percent.

EXAMPLE 6

A product is obtained by a procedure essentially the same as that of Example 2 from these reactants: the degraded polymer of Example 2, maleic anhydride (4.4 percent by weight of the polymer), and a commercial polyethylene polyamine mixture having an average of 5 amino groups per molecule (1 equivalent per equivalent of the polymer-maleic anhydride reaction product.

EXAMPLE 7

A solution of 300 parts of a terpolymer of ethylene, propylene and dicyclopentadiene, in crumb form, in 1,700 parts of a low viscosity naphthenic oil is heated to 140° C. under nitrogen, with vigorous stirring. Five parts of a $C_{12-14}$ tertiary alkyl primary amine mixture is added to inhibit darkening of the solution during degradation, and air is blown over the reaction mixture at 140°–150° C. for 6-¾ hours. After 1 hour, an additional 5 grams of tertiary alkyl primary amine mixture is added. The degraded polymer thus formed is heated to 110° C./5 mm. to remove the amine and is then filtered.

To 4,203 parts of the degraded polymer prepared as described above is added 34 parts of maleic anhydride. The mixture is heated at 190°–200° C. for 3 hours and then volatile components are removed by heating at 160° C./5 mm. The distillate is found to contain 20 parts of maleic anhydride; this is returned to the reaction vessel and the reaction is continued at 220° C. for 4 hours. Volatile components are then again removed by distillation under reduced pressure.

To the product is added 400 parts of toluene and 87 parts of aminopropylmorpholine over 5 minutes. The mixture is heated to 190° C. as an additional 50 parts of toluene is added. After heating for 2 hours at 180°–185 ° C., the reaction mixture is stripped under vacuum and filtered at 180° C., to yield an 85 percent solution in the naphthenic oil of the desired product. The oil solution of the product contains 0.31 percent nitrogen.

EXAMPLE 8

The procedure of Example 7 is repeated, except that the maleic anhydride and aminopropylmorpholine are replaced, respectively, with equivalent amounts of acrylic acid and the ethylene polyamine of Example 3. A similar product is obtained.

EXAMPLE 9

The procedure of Example 7 is repeated, except that the maleic anhydride is replaced with an equivalent amount of itaconic acid. A similar product is obtained.

The nitrogen-containing compositions of this invention are useful as additives in fuels, lubricant compositions and hydrocarbon oils. They are effective, to impart sludge inhibiting properties and detergent properties to such compositions. They are especially useful as an additive in refinery streams which are subjected to high temperature cracking, distillation, reforming or similar operations. In the latter use the nitrogen-containing products of this invention are effective to prevent the formation and accumulation of carbonaceous material which tend to be produced at high temperatures. Thus, the nitrogen-containing products of this invention have found particular use as additives in concentrations ranging from 0.5 to 10 percent by weight, in petroleum fractions which are preheated by passing them through a heat exchange unit and then subjected to high temperature refinery operations.

The heat exchange unit often employs as an economical source of heat the hot residue (coming from a high temperature refinery operation such as catalytic cracking) from which lighter petroleum fractions have been separated by high temperature distillation. As the petroleum fraction is passed through the heat exchange unit for an extended period it has a tendency to form carbonaceous decomposition products. Such products may agglomerate to form harmful deposits which restrict the free flow of the petroleum fractions and absorb heat in themselves. The latter is especially undesirable because it represents a substantial waste of heat. It is, therefore, advantageous to reduce the tendency of petroleum fractions to form carbonaceous materials and the nitrogen-containing products of this invention are particularly effective for this purpose.

The additives of this invention can be effectively employed in a variety of lubricating compositions based on diverse oils of lubricating viscosity such as a natural or synthetic lubricating oil, or suitable mixtures thereof. The lubricating compositions contemplated include principally crankcase lubricating oils for spark-ignited and compression-ignited internal combustion engines including automobile and truck engines, two-cycle engine lubricants, aviation piston engines, marine and railroad diesel engines, and the like. However, automatic transmission fluids, transaxle lubricants, gear lubricants, metal-working lubricants, hydraulic fluids, and other lubricating oil and grease compositions can benefit from the incorporation of the present additives.

Natural oils include animal oils and vegetable oils (e.g., castor oil, lard oil) as well as solvent-refined or acid-refined mineral lubricating oils of the paraffinic, naphthenic, or mixed paraffinic-naphthenic types. Oils of lubricating viscosity derived from coal or shale are also useful base oils. Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, etc.); alkyl benzenes (e.g., dodecylbenzenes, tetradecylbenzene, dinonylbenzenes, di(2-ethylhexyl)benzenes, etc.); polyphenyls (e.g., biphenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methyl-polyisopropylene glycol ether having an average molecular weight of 1,000, diphenyl ether of polyethylene glycol having a molecular weight of 500–1,000, diethyl ether of polypropylene glycol having a molecular weight of 1,000–1,500, etc.) or mono- and polycarboxylic esters thereof, for example, the acetic acid esters, mixed $C_3$-$C_8$ fatty acid esters, or the $C_{13}$ Oxo acid diester of tetraethylene glycol. Another suitable class of synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethyl-hexanoic acid, and the like. Silicon-based oils such as the polyalkyl-, polyaryl-, polyalkoxy-, or polyaryloxy-siloxane oils and silicate oils comprise another useful class of synthetic lubricants (e.g., tetraethyl-silicate, tetraisopropyl-silicate, tetra-(2-ethylhexyl)-silicate, tetra-(4-methyl-2-tetraethyl)-silicate, tetra-(p-tert-butylphenyl)-silicate, hexyl-(4-methyl-2-pentoxy)-disiloxane, poly(methyl)-siloxanes, poly(methylphenyl)-siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans, and the like.

The concentration of the nitrogen-containing compositions of this invention in a lubricating composition is usually about 0.1–10.0 parts by weight, preferably about 0.5–5.0 parts, per 100 parts of lubricating oil. However, it is frequently convenient to prepare liquid mineral oil concentrates of higher concentration (containing about 50–90 percent of the composition of this invention) for convenience in handling. The preparation of such concentrates is illustrated in the examples hereinabove.

The liquid hydrocarbon fuels in which the nitrogen-containing compositions of this invention are useful include gasoline, diesel fuels and other distillate or residual burner fuel oils which are derived from petroleum by such methods as distillation, thermal cracking or catalytic cracking. For the most part the burner fuel oil and diesel fuel have a minimum flash point of 80° F., maximum pour point of 70° F., maximum 10 percent point of 650° F., maximum 90 percent point of 900° F., minimum API gravity of 24 and a maximum viscosity value of 130 Saybolt Universal Seconds at 100° F. The concentration of the nitrogen-containing products of this invention in such fuels may range from about 0.0001 percent to about 5 percent, usually 0.001–2.0 percent, by weight.

A unique characteristic of the nitrogen-containing compositions of this invention is their effectiveness under high temperature conditions such as 300°–1,200° F. to impart sludge inhibiting and detergent properties to fuels, lubricants, oils and petroleum fractions. This effectiveness is directly related to the degraded interpolymer from which the compositions are derived. The manner in which such interpolymer imparts the high temperature effectiveness to the compositions of this invention is not fully understood. It is believed, however, that the oxidation and degradation of the interpolymer results in a polymeric product which is highly resistant to further oxidative and thermal degradation and that such resistance is imparted to the nitrogen-containing compositions of this invention. A critical element of the present invention, therefore, is the use of the degraded interpolymer in the process for preparing the nitrogen-containing compositions which are useful for the herein described purposes.

The effectiveness of the nitrogen-containing products of this invention as additives in lubricating compositions is shown by the results of an Oxidation-Dispersancy test. In this test a 350 cc. sample of a lubricant containing the additive to be tested is heated at 300° F. for 144 hours in a 2 inch × 15 inch borosilicate tube. The lubricant base employed in the test is a Mid-Continent conventionally refined mineral oil having a viscosity of about 200 Saybolt Universal Seconds at 100° F. Air is bubbled through the lubricant at a rate of 10 liters per hour. The oxidized sample is allowed to cool to 122° F. and to stand for 15 hours at room temperature and then filtered through No. 1 Whatman paper (double thickness) under slightly reduced pressure. The sludge deposit formed during the test is collected on the filter paper, washed with naphtha to a constant weight and reported as milligrams of sludge per 100 cc. of oil. The smaller the amount of the sludge deposit the more effective the detergent additive. The results are shown in Table I below.

TABLE I

Oxidation-Detergency Test

| Additive Tested (1.5% by weight of the oil-free additive in the test sample) | Test Results Milligrams of sludge/100 ml. of sample |
|---|---|
| A    none | 1800–2000 |
| B    Product of Example 2 | 7 |
| C    Product of Example 3 | 7 |
| D    Product of Example 4 | 7 |

The effectiveness of the nitrogen-containing products of this invention as an additive in fuel oils is shown by the results (Table II) of the Fuel Oil Detergency test. In this test, a mixture of 4 liters of a catalytically cracked No. 2 light fuel oil and 15 grams of a synthetic sludge (prepared by homogenizing a 50/40/10, by weight, mixture of distilled water/No. 2 uninhibited fuel oil/carbon black) is circulated for 2 hours in a fuel oil burner pump equipped with a 100-mesh Monel strainer. The sludge retained on the strainer is washed with acetone and weighed. The effectiveness of the additive is indicated by the percent reduction of the sludge retained on the strainer as compared to the sludge formed from the fuel oil containing no additive. A fuel whose rating is greater than 90 percent is considered to have excellent anti-clogging properties.

TABLE II

Fuel Oil Detergency Test

| Additive Tested (0.005% by weight in the test sample) | Test Results Milligrams of Sludge with additive | without additive | % reduction |
|---|---|---|---|
| Product of Example 2 | 111.7 | 689 | 83.8% |
| Product of Example 4 | 108.6 | 746 | 85.4% |

What is claimed is:

1. A carboxylic acid or derivative thereof which forms hydrocarbon oil-soluble products by reaction with polyamines having at least one primary or secondary amino group, said acid or derivative being prepared by reacting an unsaturated carboxylic acid or derivative thereof with an oxidized, degraded interpolymer of ethylene and propylene, said degraded interpolymer having a molecular weight of at least 1,000 and being obtained by heating a solution in an inert solvent of a higher molecular weight interpolymer at a temperature of at least about 100° C. in the presence of oxygen to cause a reduction of at least about 5 percent in the molecular weight of said interpolymer; about 1–20 percent by weight of said unsaturated carboxylic acid or derivative thereof being used based on the weight of said degraded interpolymer.

2. A carboxylic and or derivative thereof according to claim 1 prepared by reacting said oxidized, degraded interpolymer with about 1–20 percent by weight of maleic anhydride 3. A method for the preparation of a hydrocarbon oil-soluble nitrogen-containing composition of matter which comprises reacting the composition of claim 1 with a polyamine having at least one primary or secondary amino group.

4. A method according to claim 3 which comprises first preparing a carboxylic acid derivative by reacting said oxidized, degraded interpolymer with about 1–20 percent by weight of maleic anhydride, and subsequently reacting said carboxylic acid derivative with said polyamine.

5. A method according to claim 4 wherein the interpolymer is a copolymer of ethylene and propylene.

6. A method according to claim 4 wherein the interpolymer is a terpolymer of ethylene, propylene and a polymerizable diene.

7. A method according to claim 6 wherein the diene is a non-conjugated diene.

8. A method according to claim 7 wherein the interpolymer contains about 20–70 mole percent propylene units, about 30–80 mole percent ethylene units and about 1–10 mole percent diene units.

9. A hydrocarbon oil-soluble composition of matter prepared by the process of claim 3.

10. A hydrocarbon oil-soluble composition of matter prepared by the process of claim 4.

11. A hydrocarbon oil-soluble composition of matter prepared by the process of claim 7.

* * * * *